(12) United States Patent
Nozoe et al.

(10) Patent No.: US 8,598,336 B2
(45) Date of Patent: Dec. 3, 2013

(54) CELLULOSE DERIVATIVE, PROCESS OF PREPARING CELLULOSE DERIVATIVE, RESIN COMPOSITION, MOLDED ARTICLE, METHOD OF MAKING MOLDED ARTICLE, AND HOUSING FOR ELECTRONIC EQUIPMENT

(75) Inventors: Yutaka Nozoe, Kanagawa (JP); Toshihide Yoshitani, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/121,858

(22) PCT Filed: Sep. 28, 2009

(86) PCT No.: PCT/JP2009/066821
§ 371 (c)(1),
(2), (4) Date: Mar. 30, 2011

(87) PCT Pub. No.: WO2010/038711
PCT Pub. Date: Apr. 8, 2010

(65) Prior Publication Data
US 2011/0183090 A1    Jul. 28, 2011

(30) Foreign Application Priority Data

Sep. 30, 2008 (JP) ................................. 2008-255042

(51) Int. Cl.
*C08B 11/00* (2006.01)
(52) U.S. Cl.
USPC .......................................................... 536/84
(58) Field of Classification Search
None
See application file for complete search history.

(56) References Cited

U.S. PATENT DOCUMENTS

| | | | |
|---|---|---|---|
| 4,097,667 A | 6/1978 | Holst et al. |
| 4,506,066 A | 3/1985 | Medem et al. |
| 5,068,321 A | 11/1991 | Buysch et al. |
| 5,463,034 A | 10/1995 | Buysch et al. |
| 5,484,903 A | 1/1996 | Szablikowski et al. |

FOREIGN PATENT DOCUMENTS

| | | |
|---|---|---|
| JP | 52-073988 | 6/1977 |
| JP | 56-055425 | 5/1981 |
| JP | 05-065301 | 3/1993 |
| JP | 05-094006 | 4/1993 |
| JP | 05-194601 | 8/1993 |
| JP | 6-279501 | 10/1994 |
| JP | 06-279501 | 10/1994 |
| JP | 06-279502 | 10/1994 |
| JP | 2004-359737 | 12/2004 |
| JP | 2005-194302 | 7/2005 |
| JP | 2008-024919 | 2/2008 |

OTHER PUBLICATIONS

CN Office Action dated Sep. 21, 2012, with English Translation; Application No. 200980138556.4.
International Search Report, PCT/JP2009/066821, Oct. 27, 2009.
Cellulose no Jiten, Asakura Publishing Co., Ltd., Nov. 10, 2000, pp. 140 to 144, 479 to 486.
Cellulose no Kagaku, Asakura Publishing Co., Ltd., Apr. 20, 2005 pp. 114 to 116.
JP Office Action dated Feb. 12, 2013 with partial English Translation; Application No. 2008-255042.
Japanese Official Action—2008-255042—Aug. 13, 2013.

*Primary Examiner* — Layla Bland
(74) *Attorney, Agent, or Firm* — Young & Thompson

(57) ABSTRACT

A cellulose derivative and a resin composition having good thermoplasticity, strength, and elongation at break and therefore suited to molding processing are provided. The cellulose derivative is derived by replacing at least part of the hydrogen atoms of the hydroxyl groups of cellulose with a hydrocarbon group and an aliphatic or aromatic oxycarbonyl group.

8 Claims, No Drawings

CELLULOSE DERIVATIVE, PROCESS OF PREPARING CELLULOSE DERIVATIVE, RESIN COMPOSITION, MOLDED ARTICLE, METHOD OF MAKING MOLDED ARTICLE, AND HOUSING FOR ELECTRONIC EQUIPMENT

TECHNICAL FIELD

This invention relates to a novel cellulose derivative, a process for preparing the cellulose derivative, a resin composition, a molded article, a method of producing the molded article, and a housing for electronic equipment.

BACKGROUND ART

A variety of materials are chosen to make parts composing electronic equipment, such as a copier or a printer, with considerations to the characteristics or functions required of the parts. For example, polycarbonate (PC) resins, acrylonitrile-butadiene-styrene (ABS) resins, and PC/ABS resins are generally used in quantities to make parts that house and protect, e.g., a driving part of electronic equipment, as described in patent document 1 below. These resins are produced through reactions of petroleum-derived compounds.

Fossil resources such as petroleum, coal, and natural gas are composed mainly of carbon fixed in soil for long periods of time. On combusting a fossil resource or a product derived from a fossil resource, carbon dioxide is released into the air. That is, carbon that does not essentially exist in the air but is fixed deep in soil is released abruptly in the form of carbon dioxide to greatly increase carbon dioxide in the air, which is said to be a cause of global warming. Although ABS, PC, and other petroleum-derived resins have excellent characteristics as materials of electronic equipment parts, it is desirable to reduce use of such petroleum-derived resins from the viewpoint of prevention of global warming.

On the other hand, plant-derived resins are the results of photosynthesis in plants starting with carbon dioxide in the air and water. There is a concept that the carbon dioxide released from burning plant-derived resins corresponds to the carbon dioxide that originally existed in the atmosphere so that the net carbon balance is "zero", eventually resulting in no increase in total atmospheric carbon dioxide. Based on this concept, plant-derived resins are called carbon-neutral materials. It is now imperative to use carbon neutral materials in place of petroleum derived resins in view of the global warming issue.

Patent document 2 (see below) discloses a PC resin obtained from petroleum-derived materials a part of which is replaced with a plant-derived material such as starch so as to reduce the use of the petroleum resource. Aiming to develop a more near-perfect carbon-neutral material, further improvements have been sought.

PRIOR ART DOCUMENT

Patent document 1: JP-A-56-55425A
Patent document 2: JP-A-2008-24919A

SUMMARY OF THE INVENTION

Problem to be Solved by the Invention

The inventors of the present invention focused attention on using cellulose as a carbon neutral resin. However, cellulose, generally having no thermoplasticity, is unsuitable to molding processing because of difficulty to mold by heating or otherwise. Even if thermoplasticity could be imparted to cellulose, there still is the problem of largely deteriorated strength, such as impact resistance. There is also room for improvement on elongation at break.

An object of the invention is to provide a cellulose derivative and a resin composition that have good thermoplasticity, strength, and elongation at break and are therefore suited to molding processing.

Means for Solving the Problem

Focusing on the molecular structure of cellulose, the inventors have developed a cellulose derivative having a specific structure and found that the cellulose derivative exhibits good thermoplasticity, impact resistance, and elongation at break. The invention has been completed based on this finding.

The above object of the invention is thus accomplished by the provision of the following:

1. A cellulose derivative comprising:
(a) a hydrocarbon group; and
(b) at least one of an aliphatic oxycarbonyl group and an aromatic oxycarbonyl group.
2. The cellulose derivative as claimed in 1, wherein the aliphatic oxycarbonyl group or the aromatic oxycarbonyl group (b) is an aliphatic carbonyloxy group.
3. The cellulose derivative as claimed in 2, wherein the number of carbon atoms in the aliphatic group of the aliphatic carbonyloxy group is 6 to 10.
4. The cellulose derivative as claimed in 1, wherein the number of carbon atoms in the hydrocarbon group is 1 to 9.
5. The cellulose derivative as claimed in 1, wherein the hydrocarbon group (a) is a methyl group or an ethyl group.
6. The cellulose derivative as claimed in 1, wherein the hydrocarbon group (a) is a methyl group.
7. A process for preparing the cellulose derivative as claimed in 1, comprising a step of allowing a cellulose ether to react with a chloroformic acid ester in the presence of a base.
8. A resin composition comprising the cellulose derivative as claimed in 1.
9. A molded article obtained by molding the cellulose derivative as claimed in 1 or the resin composition according to 8.
10. A method for making a molded article comprising a step of heating and molding the cellulose derivative according to 1 or the resin composition as claimed in 8.
11. A housing for an electronic equipment comprising the molded article as claimed in 9.

Effect of the Invention

Having excellent thermoplasticity, the cellulose derivative and the resin composition according to the invention are moldable into molded articles. The molded article obtained from the cellulose derivative or the resin composition of the invention has good impact resistance, elongation at break, and so on and is therefore suited for use as a part required to have impact resistance and elongation at break, such as a housing of electronic equipment. Derived from plants, the cellulose derivative of the invention will substitute for conventional petroleum-derived resins as a material contributory to the prevention of global warming.

BEST MODE FOR CARRYING OUT THE INVENTION

The cellulose derivative of the invention comprises (a) a hydrocarbon group and (b) at least one of an aliphatic oxycarbonyl group and an aromatic oxycarbonyl group.

That is, the cellulose derivative is obtained by replacing at least part of the hydrogen atoms of the hydroxyl groups of cellulose $((C_6H_{10}O_5)_n)$ with (a) a hydrocarbon group and (b) at least one of an aliphatic oxycarbonyl group and an aromatic oxycarbonyl group. Replacement with a hydrocarbon group provides an ether structure. Replacement with an aliphatic oxycarbonyl group or an aromatic oxycarbonyl group forms a carbonate structure (—O—C(O)—O—R, wherein R is an aliphatic or aromatic group). In Examples given later, a cellulose derivative having an aliphatic or aromatic oxycarbonyl group is called a "cellulose (the name of the aliphatic or aromatic group) carbonate".

The invention will be illustrated in greater detail.

1. Cellulose Derivative

The cellulose derivative of the invention comprises (a) a hydrocarbon group and (b) at least one of an aliphatic oxycarbonyl group and an aromatic oxycarbonyl group. That is, the cellulose derivative has a repeating unit represented by general formula (1):

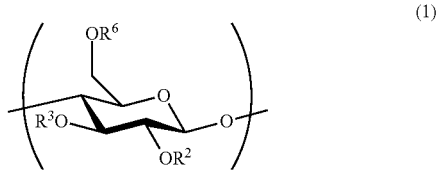

(1)

wherein $R^2$, $R^3$, and $R^6$ each independently represent a hydrogen atom, a hydrocarbon group, an aliphatic oxycarbonyl group, or an aromatic oxycarbonyl group provided that at least one of $R^2$, $R^3$, and $R^6$ represents a hydrocarbon group and that at least one of $R^2$, $R^3$, and $R^6$ represents an aliphatic oxycarbonyl group or an aromatic oxycarbonyl group.

The cellulose derivative of the invention exhibits thermoplasticity and is thereby suitable for molding processing because of the replacement of at least some of the hydrogen atoms of the hydroxyl groups of the β-glucose unit with a hydrocarbon group and at least one of an aliphatic oxycarbonyl group and an aromatic oxycarbonyl group. When molded, the cellulose derivative of the invention provides a molded article exhibiting high strength and elongation at break. Furthermore, since cellulose is, being completely plant-derived, carbon neutral, use of the cellulose derivative greatly reduces the environment load.

As used herein, the term "cellulose" refers to a high molecular compound in which a large number of glucose units are linked by β-1,4-glycoside bonds with all the hydroxyl groups bonded at the 2-, 3-, and 6-positions of each glucose unit being unsubstituted. The phrase "hydroxyl groups of cellulose" as used herein refers to the hydroxyl groups bonded at the 2-, 3-, and 6-positions of glucose units of cellulose.

It is only necessary for the cellulose derivative to have a hydrocarbon group and an aliphatic or aromatic oxycarbonyl group in any part of it. That is, the cellulose derivative may be composed of a single kind or two or more different kinds of units. It is not necessary for the cellulose derivative to have both a hydrocarbon group and an aliphatic or aromatic oxycarbonyl group per unit.

Exemplary embodiments of the cellulose derivative of the invention include the following:

(1) A cellulose derivative having a repeating unit in which at least one of $R^2$, $R^3$, and $R^6$ is substituted with a hydrocarbon group and a repeating unit in which at least one of $R^2$, $R^3$, and $R^6$ is substituted with an aliphatic oxycarbonyl group or an aromatic oxycarbonyl group.

(2) A cellulose derivative composed of a single kind of a repeating unit in which any one or two of $R^2$, $R^3$, and $R^6$ is/are substituted with a hydrocarbon group and any one or two of $R^2$, $R^3$, and $R^6$ is/are substituted with an aliphatic oxycarbonyl group or an aromatic oxycarbonyl group.

(3) A cellulose derivative composed of randomly linked repeating units of different kinds that are represented by general formula (1).

The cellulose derivative may have an unsubstituted repeating unit, i.e., a unit in which all of $R^2$, $R^3$, and $R^6$ are hydrogen.

The hydrocarbon group (a) may be an aliphatic group or an aromatic group.

The hydrocarbon group (a) which is aliphatic may be straight, branched, or cyclic and may have an unsaturated bond. Examples of the aliphatic group include alkyl, cycloalkyl, alkenyl, and alkynyl. Specific examples include methyl, ethyl, propyl, isopropyl, butyl, isobutyl, pentyl, hexyl, heptyl, octyl, 2-ethylhexyl, nonyl, and cyclohexyl, with methyl and ethyl being preferred. Methyl is more preferred. The aliphatic hydrocarbon groups per molecule may be the same or different.

The hydrocarbon group (a) which is aromatic preferably contains 6 to 18, more preferably 6 to 10, carbon atoms. Examples are phenyl, naphthyl, benzyl, 2-phenylethyl, 3-phenylpropyl, 1-methyl-2-phenylethyl, cinnamyl, and trityl, with benzyl being preferred.

The hydrocarbon group preferably contains 1 to 9 carbon atoms, more preferably 1 to 4 carbon atoms.

The hydrocarbon group is preferably an aliphatic group.

The hydrocarbon group may have a substituent, such as halogen (e.g., fluorine, chlorine, bromine, or iodine) or cyano.

Examples of the hydrocarbon groups that are preferred include, but are not limited to, the following groups, designated A-1 through A-18:

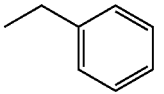

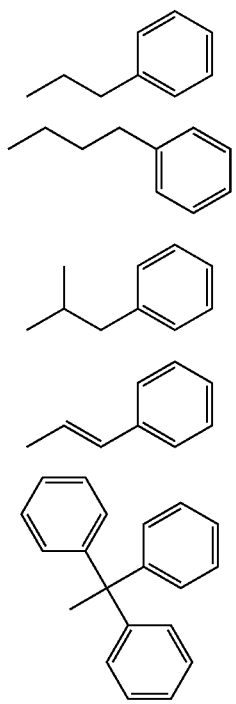

A-14

A-15

A-16

A-17

A-18

The aliphatic group of the aliphatic oxycarbonyl group (b) preferably contains 1 to 18, more preferably 3 to 10, even more preferably 6 to 10, carbon atoms particularly preferably 7 to 9. The aliphatic moiety of the aliphatic oxycarbonyl group may have a straight chain, branched, or cyclic structure. Examples of the aliphatic group include methyl, ethyl, propyl, isopropyl, allyl, isopropentyl, butyl, isobutyl, 3-butenyl, pentyl, hexyl, phenyl, heptyl, octyl, benzyl, tolyl, octyl, 2-ethylhexyl, nonyl, decyl, undecyl, and dodecyl. The aliphatic groups per molecule may be the same or different.

The aromatic group of the aromatic oxycarbonyl group (b) preferably contains 6 to 30, more preferably 6 to 20, even more preferably 6 to 10, carbon atoms. Examples of the aromatic group include phenyl, alkylphenyl, naphthyl, phenanthryl, anthryl, benzyl, 2-phenylethyl, 3-phenylpropyl, 1-methyl-2-phenylethyl, cinnamyl, and trityl, with phenyl, alkylmethylphenyl, and benzyl being preferred.

The aliphatic or aromatic oxycarbonyl group may have a substituent, such as hydroxyl, mercapto, halogen (e.g., fluorine, chlorine, bromine, or iodine), cyano, sulfo, carboxyl, nitro, hydroxamic acid group, sulfino, hydrazino, and imino.

While it is only necessary for the cellulose derivative of the invention to have at least one of the aliphatic oxycarbonyl group and the aromatic oxycarbonyl group as the substituent (b), it is preferred for the cellulose derivative to have at least the aliphatic oxycarbonyl group.

Examples of the aliphatic and the aromatic oxycarbonyl groups that are preferred include, but are not limited to, the following groups.

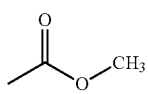

B-1

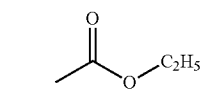

B-2

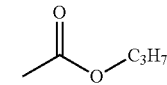

B-3

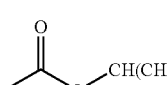

B-4

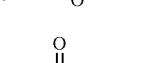

B-5

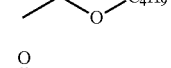

B-6

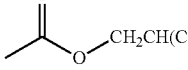

B-7

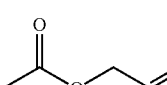

B-8

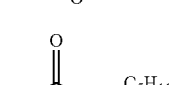

B-9

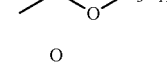

B-10

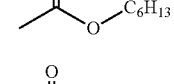

B-11

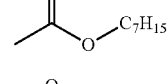

B-12

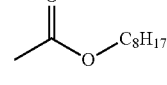

B-13

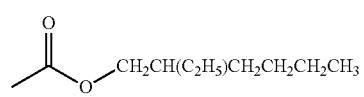

B-14

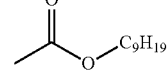

B-15

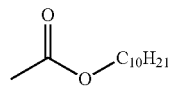

B-16

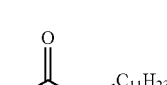

B-17

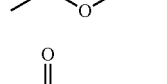

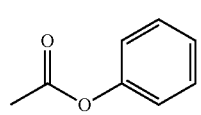

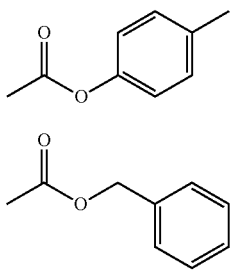

B-18

B-19

The positions of substitution with the hydrocarbon group and the aliphatic oxycarbonyl group or the aromatic oxycarbonyl group and the numbers of the hydrocarbon group and the aliphatic or aromatic oxycarbonyl groups per β-glucose unit (i.e., the degrees of substitution) are not particularly limited.

The degree of substitution of a hydrocarbon group which is defined as the number of the hydroxyl groups at the 2-, 3-, and 6-positions substituted with a hydrocarbon group per β-glucose unit (hereinafter $DS_B$) is preferably 1.0 or greater, more preferably in a range of from 1.5 to 2.5.

The degree of substitution of an aliphatic oxycarbonyl group or an aromatic oxycarbonyl group which is defined as the number of the hydroxyl groups at the 2-, 3-, and 6-positions substituted with an aliphatic oxycarbonyl group or an aromatic oxycarbonyl group per β-glucose unit (hereinafter $DS_C$) is preferably 0.1 or greater, more preferably in a range of from 0.3 to 1.5. When $DS_B$ and $DS_C$ fall within the respective ranges recited, improvements on breaking elongation, reduction of brittleness, and the like will result.

The number of unsubstituted hydroxyl groups in the cellulose derivative is not particularly limited, either. The degree of hydrogen substitution (i.e., the number of unsubstituted hydroxyl groups at the 2-, 3-, and 6-positions per β-glucose unit; hereinafter $DS_A$) is preferably 0.01 to 1.5, more preferably from 0.2 to 1.2. The cellulose derivative having a $DS_A$ of 0.01 or greater provides a resin composition with improved fluidity. The cellulose derivative having a $DS_A$ of 1.5 or smaller provides a resin composition that has improved fluidity and is prevented from accelerated thermal decomposition and foaming due to water absorption during molding.

The sum of the degrees of substitution ($DS_A+DS_B+DS_C$) is three.

The number average molecular weight (Mn) of the cellulose derivative is preferably in the range of from 5000 to 1,000,000, more preferably form 10,000 to 500,000, even more preferably form 50,000 to 200,000. The weight average molecular weight (Mw) of the cellulose derivative is preferably in the range of from 7,000 to 5,000,000, more preferably form 15,000 to 2,500,000, even more preferably form 200,000 to 1,500,000. The molecular weight distribution (MWD) of the cellulose derivative is preferably in the range of from 1.1 to 10, more preferably from 1.5 to 7. Within the average molecular weights recited, improvements in molding properties, mechanical strength, and the like are obtained. With the MWD falling in that range, improved molding properties and the like are obtained.

The number average molecular weight Mn, weight average molecular weight Mw, and molecular weight distribution MWD may be determined by gel permeation chromatography (GPC). Specifically, GPC may be carried out using a tetrahydrofuran solvent and polystyrene gels. The molecular weight of a sample is obtained using a molecular weight calibration curve previously prepared from a calibration curve of monodisperse polystyrene standards.

The cellulose derivative of the invention may have any substituent other than those described above.

2. Process of Preparing Cellulose Derivative

The process of preparing the cellulose derivative of the invention is not particularly limited. The cellulose derivative is obtained by displacing the hydrogen atoms of the hydroxyl groups of cellulose with a hydrocarbon group and at least one of an aliphatic oxycarbonyl group and an aromatic oxycarbonyl group. Any raw material of cellulose is usable, including cotton, linter, and pulp.

In a preferred embodiment, the cellulose derivative is prepared by a process including the step of allowing a cellulose ether (cellulose having at least part of the hydrogen atoms of the 2-, 3-, and 6-positioned hydroxyl groups of the β-glucose units replaced with a hydrocarbon group) to react with, for example, a chloroformic acid ester in the presence of a base.

The cellulose ether is exemplified by cellulose having the hydrogen of the hydroxyl groups thereof replaced with a hydrocarbon group, including methyl cellulose, ethyl cellulose, propyl cellulose, butyl cellulose, allyl cellulose, and benzyl cellulose.

Examples of the chloroformic acid esters include methyl chloroformate, ethyl chloroformate, propyl chloroformate, isopropyl chloroformate, butyl chloroformate, isobutyl chloroformate, hexyl chloroformate, tolyl chloroformate, octyl chloroformate, 2-ethylhexyl chloroformate, phenyl chloroformate, and benzyl chloroformate.

Examples of the base include pyridine, lutidine, dimethylaminopyridine, triethylamine, diethylbutylamine, diazabicycloundecene, and potassium carbonate. Preferred of them are pyridine and dimethylaminopyridine.

Reaction conditions and other details for the preparation of the cellulose derivative are in accordance with known processes. For example, reference can be made to *Cellulose no jiten*, Asakura Shoten, pp. 131-164, 2000.

3. Resin Composition Containing Cellulose Derivative and Molded Article

The resin composition of the invention contains the cellulose derivative of the invention and may contain, if necessary, other additives.

The proportions of the components making up the resin composition are not particularly limited. The content of the cellulose derivative in the resin composition is preferably at least 75%, more preferably 80% or more, even more preferably 80% to 100%, by mass.

If desired, the resin composition may contain various additives, such as a filler and a flame retardant, in addition to the cellulose derivative of the invention.

The resin composition of the invention may contain a filler (or a reinforcement material) to enhance the mechanical characteristics of a molded article obtained therefrom.

Any known filler, either organic or inorganic, may be used. The filler may have any form, such as fibrous, platy, granular, or powdered.

Examples of useful inorganic fillers include fibrous materials, such as glass fiber, carbon fiber, graphite fiber, metal fiber, potassium titanate whisker, aluminum borate whisker, magnesium-based whisker, silicon-based whisker, wollastonite, sepiolite, slag fiber, zonolite, ellestadite, gypsum fiber, silica fiber, silica-alumina fiber, zirconia fiber, boron nitride fiber, silicon nitride fiber, and boron fiber; and platy or granular materials, such as glass flake, nonswelling mica, carbon black, graphite, metal foil, ceramic beads, talc, clay, mica, sericite, zeolite, bentonite, dolomite, kaolin, finely powdered silicic acid, feldspar powder, potassium titanate, shirasu balloon, calcium carbonate, magnesium carbonate, barium sulfate, calcium oxide, aluminum oxide, titanium oxide, magnesium oxide, aluminum silicate, silicon oxide, aluminum hydroxide, magnesium hydroxide, gypsum, novaculite, dosonite, and terra abla.

Examples of useful organic fillers include synthetic fibers, such as polyester fiber, nylon fiber, acrylic fiber, regenerated cellulose filer, and acetate fiber; natural fibers, such as kenaf, ramie, cotton, jute, hemp, sisal, manila hemp, flax or linen, silk, and wool; microcrystalline cellulose; fibrous fillers obtained from sugarcane, wood pulp, paper litter or used paper; and particulate organic fillers, such as organic pigments.

The amount of the filler, if used, is usually, but not limited to, 30 parts by mass or less, preferably 5 to 10 parts by mass, per 100 parts by mass of the cellulose derivative.

The resin composition may contain a flame retardant to have improved flame retardancy, such as a reduced or controlled rate of burning. Any commonly used flame retardants may be used, such as bromine-containing flame retardants, chlorine containing flame retardants, phosphorus containing flame retardants, silicon containing flame retardants, nitrogen containing flame retardants, and inorganic flame retardants. Preferred of them are phosphorus containing flame retardants and silicon containing flame retardants because they are less likely to release a hydrogen halide on thermal decomposition during compounding with a resin or during molding, which would corrode a processing machine or a mold and deteriorate the working environment, or, when a molded article is incinerated for disposal, they are less likely to release free halogen or decompose to produce harmful substances such as dioxins, resulting in adverse effects on the environment.

Any known phosphorus-containing flame retardants can be used, including organic phosphorus compounds, such as phosphoric esters, condensed phosphoric acid esters, and polyphosphoric acid salts.

Examples of the phosphoric esters include trimethyl phosphate, triethyl phosphate, tributyl phosphate, tri(2-ethylhexyl)phosphate, tributoxyethyl phosphate, triphenyl phosphate, tricresyl phosphate, trixylenyl phosphate, tris(isopropylphenyl)phosphate, tris(phenylphenyl)phosphate, trinaphthyl phosphate, cresyldiphenyl phosphate, xylenyldiphenyl phosphate, diphenyl(2-ethylhexyl)phosphate, di(isopropylphenyl)phenyl phosphate, monoisodecyl phosphate, 2-acryloyloxyethyl acid phosphate, 2-methacryloyloxyethyl acid phosphate, diphenyl 2-acryloyloxyethyl phosphate, diphenyl 2-methacryloyloxyethyl phosphate, melamine phosphate, dimelamine phosphate, melamine pyrophosphate, triphenylphosphine oxide, tricresylphosphine oxide, diphenyl methanephosphonate, and diethyl phenylphosphonate.

Examples of the condensed phosphoric acid esters include aromatic condensed phosphoric acid esters, such as resorcinol polyphenyl phosphate, resorcinol poly(di-2,6-xylyl)phosphate, bisphenol A polycresyl phosphate, hydroquinone poly(2,6-xylyl)phosphate, and condensation products thereof.

Examples of polyphosphoric acid salts include those formed of phosphoric acid or polyphosphoric acids with metals of groups 1 to 14 of the Periodic Table, ammonia, aliphatic amines, or aromatic amines. Typical examples of polyphosphoric acid salts are metal salts, such as lithium salts, sodium salts, calcium salts, barium salts, iron (II) salts, iron (III) salts, and aluminum salts; aliphatic amine salts, such as methylamine salts, ethylamine salts, diethylamine salts, triethylamine salts, ethylenediamine salts, and piperazine salts; and aromatic amine salts, such as pyridine salts and triazine.

Examples of phosphorus containing flame retardants further include halogen-containing phosphoric esters, such as trischloroethyl phosphate, trisdichloropropyl phosphate, and tris($\beta$-chloropropyl)phosphate; phosphazene compound in which a phosphorus atom and a nitrogen atom are bonded through a double bond; and phosphoric ester amides. The above described phosphorus containing flame retardants may be used either individually or in combination of two or more thereof.

Examples of the silicon containing flame retardant include organosilicon compounds having a two-dimensional or three-dimensional structure, polydimethylsiloxane, and polydimethylsiloxane having its side-chain or terminal methyl group replaced or modified with a hydrogen atom, a substituted or unsubstituted aliphatic hydrocarbon group, or a substituted or unsubstituted aromatic hydrocarbon group, namely, silicone oil or modified silicone oil.

Examples of the substituted or unsubstituted aliphatic or aromatic hydrocarbon groups include an alkyl group, a cycloalkyl group, a phenyl group, a benzyl group, an amino group, an epoxy group, a polyether group, a carboxyl group, a mercapto group, a chloroalkyl group, an alkyl higher alcohol ester group, an alcoholic group, an aralkyl group, a vinyl group, and a trifluoromethyl group.

These silicon containing flame retardants may be used either alone or in combination of two or more thereof.

In addition to the phosphorus containing flame retardants and silicon containing flame retardants also useful are inorganic flame retardants, such as magnesium hydroxide, aluminum hydroxide, antimony trioxide, antimony pentoxide, sodium antimonate, zinc hydroxylstannate, zinc stannate, metastannic acid, tin oxide, tin oxide salts, zinc sulfate, zinc oxide, ferrous oxide, ferric oxide, stannous oxide, stannic oxide, zinc borate, ammonium borate, ammonium octamolybdate, metal salts of tungustic acid, complex oxide acids of tungsten and a metalloid, ammonium sulfamate, ammonium bromide, zirconium compounds, guanidine compounds, fluorine compounds, graphite, and swelling graphite. These flame retardants may be used either individually or in combination of two or more thereof.

The amount of the flame retardant, if used, is not critical but is usually 30 pats by mass or less, preferably 2 to 10 parts by mass, per 100 parts by mass of the cellulose derivative. As long as the amount of the flame retardant is in that range, improved impact resistance and reduction of brittleness are obtained while preventing pellets from blocking.

The resin composition of the invention may further contain other components in addition to the cellulose derivative, the filler, and the flame retardant for the purpose of further improving various characteristics, such as molding properties and flame retardance, within ranges that may not hinder achieving the objects of the invention. Examples of other components that may be added include polymers other than the cellulose derivative described, plasticizers, stabilizers (e.g., antioxidants and UV absorbers), and release agents (e.g., fatty acids, fatty acid metal salts, oxy fatty acids, fatty acid esters, partially saponified aliphatic esters, paraffin, low molecular polyolefins, fatty acid amides, alkylenebis fatty acid amides, aliphatic ketones, fatty acid lower alcohol esters, fatty acid polyhydric alcohol esters, fatty acid polyglycol esters, and modified silicone). Coloring agents including dyes and pigments may also be added.

The polymer other than the cellulose derivative may be thermoplastic or thermosetting, but thermoplastic polymers are preferred in terms of molding properties. Examples of the other polymers include polyolefins, such as low density polyethylene, high density polyethylene, and polypropylene, polyesters, polyamides, polystyrene, polyacetals, polyurethanes, aromatic or aliphatic polyketones, polyphenylene sulfide, polyether ether ketones, polyimides, thermoplastic starch resins, polystyrene, acrylic resins, AS resins, ABS resins, AES resins, ACS resins, AAS resins, polyvinyl chloride resins, polyvinylidene chloride, vinyl ester resins, polyurethanes, MS resins, polycarbonates, polyarylates, polysulfones, polyether sulfones, phenoxy resins, polyphenylene oxide, poly-4-methylpentene-1, polyether imides, cellulose acetate, polyvinyl alcohol, unsaturated polyesters, melamine resins, phenol resins, and urea resins. Also included are ethylene-propylene copolymers, ethylene-propylene-non-conjugated diene copolymers, ethylene-butene-1 copolymers, various acrylic rubbers, ethylene-acrylic acid copolymers and alkali metal salts thereof (also called ionomers), ethyleneglycidyl (meth)acrylate copolymers, ethylene-alkyl acrylate copolymers (e.g. ethylene-ethyl acrylate copolymers and ethylene-butyl acrylate copolymers), acid-modified ethylene-propylene copolymers, diene rubbers (e.g., polybutadiene, polyisoprene, and polychloroprene), diene-vinyl monomer copolymers (e.g. styrene-butadiene random copolymers, styrene-butadiene block copolymers, styrene-butadiene-styrene block copolymers, styrene-isoprene random copolymers, styrene-isoprene block copolymers, styrene-isoprene-styrene block copolymers, styrene-grafted polybutadiene, and butadiene-acrylonitrile copolymers), polyisobutylene, copolymers of isobutylene and butadiene or isoprene, natural rubbers, Thiokol rubbers, polysulfide rubbers, acrylic rubbers, polyurethane rubbers, polyether rubbers, and epichlorohydrin rubbers.

The other polymers furthermore include crosslinked polymers having various degrees of crosslinking, polymers having various microstructures, such as a cis-structure and a trans-structure, polymers having a vinyl group and the like, polymers having various average particle sizes (particle sizes in a resin composition), polymers having a multilayered structure, called core-shell rubbers, composed of a core layer and one or more shell layers in which adjoining layers are formed of different polymers, and core-shell rubbers containing a silicone compound. These other polymers may be used either individually or in combination of two or more thereof.

When the resin composition contains the other polymer in addition to the cellulose derivative, the amount of the other polymer is preferably 30 parts by mass or less, more preferably 2 to 10 parts by mass, per 100 parts by mass of the cellulose derivative.

The plasticizer, that can be used to further improve flame retardance and molding properties of the resin composition, may be selected from those commonly used in polymer molding, such as polyester plasticizers, glycerol plasticizers, polycarboxylic ester plasticizers, polyalkylene glycol plasticizers, and epoxy plasticizers.

Examples of the polyester plasticizers include polyesters between an acid component, such as adipic acid, sebacic acid, terephthalic acid, isophthalic acid, naphthalenedicarboxylic acid, diphenyldicarboxylic acid, or rosin, and a diol component, such as propylene glycol, 1,3-butanediol, 1,4-butanediol, 1,6-hexanediol, ethylene glycol, or diethylene glycol; and polyesters from hydroxycarboxylic acids, such as polycaprolactone. The polyesters may have their terminal blocked with a monofunctional carboxylic acid or a monofunctional alcohol or with an epoxy compound, etc.

Examples of the glycerol plasticizers are glycerol monoacetate monolaurate, glycerol diacetate monolaurate, glycerol monoacetate monostearate, glycerol diacetate monooleate, and glycerol monoacetate monomontanate.

Examples of the polycarboxylic acid plasticizers include phthalic esters, such as dimethyl phthalate, diethyl phthalate, dibutyl phthalate, dioctyl phthalate, diheptyl phthalate, dibenzyl phthalate, and butylbenzyl phthalate; trimellitic esters, such as tributyl trimellitate, trioctyl trimellitate, and trihexyl trimellitate; adipic esters, such as diisodecyl adipate, n-octyl-n-decyl adipate, methyl diglycol butyl diglycol adipate, benzylmethyl diglycol adipate, and benzylbutyl diglycol adipate; citric esters, such as acetyl triethyl citrate and acetyl tributyl citrate; azelaic esters, such as di-2-ethylhexyl azelate; dibutyl sebacate, and di-2-ethylhexyl sebacate.

Examples of the polyalkylene glycol plasticizers include polyalkylene glycols and epoxy-, ester-, or ether-terminated polyalkylene glycols, such as polyethylene glycol, polypropylene glycol, poly(ethylene oxide-propylene oxide) block and/or random copolymers, polytetramethylene glycol, bisphenol-ethylene oxide addition polymers, bisphenol-propylene oxide addition polymers, and bisphenol-tetrahydrofuran addition polymers.

The epoxy plasticizer generally refers to an epoxy triglyceride formed of an alkyl epoxystearate and soybean oil. In addition, epoxy resins such as obtained mainly from bisphenol A and epichlorohydrin are also useful as an epoxy plasticizer.

Examples of other useful plasticizers include benzoic acid esters of aliphatic polyols, such as neopentyl glycol dibenzoate, diethylene glycol dibenzoate, and triethylene glycol di-2-ethylbutyrate; fatty acid amides, such as stearamide; aliphatic carboxylic acid esters, such as butyl oleate; oxyacid esters, such as methyl acetyl ricinoleate and butyl acetyl ricinoleate; pentaerythritol and sorbitols.

The amount of the plasticizer, if used, is usually not more than 5 parts, preferably 0.005 to 5 parts, more preferably 0.01 to 1 part, by mass per 100 parts by mass of the cellulose derivative.

The molded article of the invention is obtained by molding the cellulose derivative of the invention or the resin composition of the invention containing the cellulose derivative of the invention and an additive, preferably a filler. In more detail, the molded article is obtained by a method including the step of heating and molding the cellulose derivative or the resin composition containing the cellulose derivative, a filler, and the like, by various molding methods.

Useful molding methods include injection molding, extrusion, and blow molding. The heating temperature usually ranges from 160° to 260° C., preferably from 180° to 240° C.

Applications of the molded article of the invention include, but are not limited to, interior and exterior parts of electrical or electronic equipment (such as home appliances, office equipment, media-related equipment, optical equipment, and communications equipment), automobile parts, machine parts, and architectural materials for houses and buildings. The molded article is particularly suited for use as exterior parts, especially housings, of electrical or electronic equipment such as copiers, printers, personal computers, and TV sets, because of its high resistance to heat and impact and environmental friendliness.

EXAMPLES

The invention will now be illustrated in greater detail with reference to Examples and Comparative Examples, but it should be understood that the invention is not deemed to be limited thereto.

Synthesis Example 1

Synthesis of Methyl Cellulose Propyl Carbonate (P-1)

In a 5-liter three-necked flask equipped with a mechanical stirrer, a thermometer, a condenser, and a dropping funnel were put 50 g of methyl cellulose (degree of methyl substitution=1.8; from Wako Pure Chemical Industries, Ltd.) and 2 L of pyridine and stirred at room temperature. After dissolution was confirmed, 295 g of propyl chloroformate was slowly added thereto dropwise while cooling with ice, followed by stirring at a temperature between 5° C. and 15° C. for 3 hours. After the reaction, 200 ml of methanol was added to the reaction system to quench the reaction. The reaction mixture was poured into methanol/water (5 L/5 L) while vigorously stirring, whereupon a yellowish white solid precipitated. The precipitate was collected by filtration by suction, washed three times with quantities of methanol. The resulting white solid was dried in vacuo at 100° C. for 6 hours to give 56.0 g of the title cellulose derivative P-1 (methyl cellulose propyl carbonate) as white powder, the degrees of substitution of which are shown in Table 2.

Synthesis Example 2

Synthesis of Methyl Cellulose Hexyl Carbonate (P-2)

The title cellulose derivative P-2 (methyl cellulose hexyl carbonate), the degrees of substitution of which are shown in Table 2, was obtained as white powder in a yield of 62.0 g in the same manner as in Synthesis Example 1, except for replacing propyl chloroformate with hexyl chloroformate.

Synthesis Example 3

Synthesis of Methyl Cellulose Octyl Carbonate (P-3)

The title cellulose derivative P-3 (methyl cellulose octyl carbonate), the degrees of substitution of which are shown in Table 2, was obtained as white powder in a yield of 60.2 g in the same manner as in Synthesis Example 1, except for replacing propyl chloroformate with octyl chloroformate.

Synthesis Example 4

Synthesis of Methyl Cellulose 2-Ethylhexyl Carbonate (P-4)

The title cellulose derivative P-4 (methyl cellulose 2-ethylhexyl carbonate), the degrees of substitution of which are shown in Table 2, was obtained as white powder in a yield of 60.0 g in the same manner as in Synthesis Example 1, except for replacing the methyl cellulose (degree of methyl substitution=1.8; from Wako Pure Chemical) with a comparative compound (H-2, described below) and replacing propyl chloroformate with 2-ethylhexyl chloroformate.

Synthesis Example 5

Synthesis of Methyl Cellulose 2-Ethylhexyl Carbonate (P-5)

The title cellulose derivative P-5 (methyl cellulose 2-ethylhexyl carbonate), the degrees of substitution of which are shown in Table 2, was obtained as white powder in a yield of 71.1 g in the same manner as in Synthesis Example 1, except for replacing propyl chloroformate with 2-ethylhexyl chloroformate.

Synthesis Example 6

Synthesis of Methyl Cellulose Isopropyl Carbonate (P-6)

The title cellulose derivative P-6 (methyl cellulose isopropyl carbonate), the degrees of substitution of which are shown in Table 2, was obtained as white powder in a yield of 37.2 g in the same manner as in Synthesis Example 1, except for replacing the methyl cellulose (degree of methyl substitution=1.8; from Wako Pure Chemical) with a comparative compound (H-2, shown below) and replacing propyl chloroformate with isopropyl chloroformate.

Synthesis Example 7

Synthesis of Ethyl Cellulose Octyl Carbonate (P-7)

The title cellulose derivative P-7 (ethyl cellulose octyl carbonate), the degrees of substitution of which are shown in Table 2, was obtained as white powder in a yield of 44.4 g in the same manner as in Synthesis Example 1, except for replacing the methyl cellulose (degree of methyl substitution=1.8; from Wako Pure Chemical) with ethyl cellulose (degree of ethyl substitution=2.4; from Sigma-Aldrich) and replacing propyl chloroformate with octyl chloroformate.

Synthesis Example 8

Synthesis of Ethyl Cellulose 2-Ethylhexyl Carbonate (P-8)

The title cellulose derivative P-8 (ethyl cellulose 2-ethylhexyl carbonate), the degrees of substitution of which are shown in Table 2, was obtained as white powder in a yield of 47.0 g in the same manner as in Synthesis Example 1, except for replacing the methyl cellulose (degree of methyl substitution=1.8; from Wako Pure Chemical) with ethyl cellulose (degree of ethyl substitution=2.4; from Sigma-Aldrich) and replacing propyl chloroformate with 2-ethylhexyl chloroformate.

Synthesis Example 9

Synthesis of Methyl Cellulose Phenyl Carbonate (P-9)

The title cellulose derivative P-9 (methyl cellulose phenyl carbonate), the degrees of substitution of which are shown in Table 2, was obtained as yellowish white powder in a yield of 85.7 g in the same manner as in Synthesis Example 1, except for replacing propyl chloroformate with phenyl chloroformate.

Comparative Synthesis Example 1

Synthesis of Cellulose Ethyl Carbonate (H-1)

In a 3-liter three-necked flask equipped with a mechanical stirrer, a thermometer, a condenser, and a dropping funnel were put 50 g of cellulose (KC Flock W400, from Nippon Paper Industries Co., Ltd) and 1.8 L of dimethylacetamide and stirred at 120° C. for 2 hours. To the reaction mixture was added 150 g of lithium chloride, followed by stirring for one hour. After the reaction mixture was allowed to cool to room temperature, 370 ml of pyridine was added thereto. To the reaction mixture was dropwise added 502 g of ethyl chloroformate while cooling with ice, followed by stirring at room temperature for 5 hours. The reaction mixture was poured into 10 L of methanol while vigorously stirring, whereupon a yellowish white solid precipitated. The precipitate was collected by filtration by suction, washed three times with quantities of methanol. The resulting yellowish white solid was dried in vacuo at 100° C. for 6 hours to yield 81.6 g of the title cellulose derivative H-1 (cellulose ethyl carbonate), the degrees of substitution of which are shown in Table 2, as yellowish white powder.

Comparative Synthesis Example 2

Synthesis of Methyl Cellulose (H-2)

In a 3-liter three-necked flask equipped with a mechanical stirrer, a thermometer, a condenser, and a dropping funnel were put 100 g of methyl cellulose (degree of methyl substitution=1.8, from Wako Pure Chemical) and 2 L of dimethylacetamide and stirred at room temperature. To the mixture was added 100 g of sodium hydroxide powder, followed by stirring at 60° C. for 1 hour. The reaction mixture was cooled, and 80 ml of methyl iodide was added thereto while cooling with ice, followed by stirring at 50° C. for 3 hours. The reaction mixture was poured into 12 L of methanol while vigorously stirring, whereupon a white solid precipitated. The precipitate was collected by filtration by suction, washed three times with quantities of isopropyl alcohol. The resulting white solid was dried in vacuo at 100° C. for 6 hours to give 85.3 g of the title cellulose derivative H-2 (methyl cellulose; degree of methyl substitution=2.1) as a white powder.

Comparative Synthesis Example 3

Synthesis of Ethyl Carbonate Acetyl Cellulose (H-5)

In a 3-liter three-necked flask equipped with a mechanical stirrer, a thermometer, a condenser, and a dropping funnel were put 70 g of acetyl cellulose (degree of acetyl substitution=2.2, from Daicel Chemical Industries, Ltd.) and 1.4 L of pyridine and stirred at room temperature. To the mixture was added 42 g of ethyl chloroformate while cooling with ice, followed by stirring at 10° C. for 1 hour. The reaction solution was diluted with 1.4 L of acetone, and the solution was poured into water/methanol (10 L/10 L) while vigorously stirring, whereupon a white solid precipitated. The precipitate was collected by filtration by suction, washed three times with quantities of isopropyl alcohol. The resulting white solid was dried in vacuo at 100° C. for 6 hours to yield 75.0 g of the title cellulose derivative H-5 (ethyl carbonate acetyl cellulose; degree of acetyl substitution=2.2; degree of ethyl carbonate substitution=0.3) as a white powder.

The resulting compounds were characterized by determining the kinds of the functional groups ($R^2$, $R^3$, and $R^6$) substituting the hydroxyl groups of cellulose and $DS_A$, $DS_B$, and $DS_C$ by $^1$H-NMR or $^{13}$C-NMR analysis in accordance with the methods described in *Cellulose Communication* vol. 6, pp. 73-79, 1999 and *Chirality*, vol. 12, No. 9, pp. 670-674. Determination of Physical Properties of Cellulose Derivatives:

The number average molecular weight Mn, weight average molecular weight Mw, molecular weight distribution MWD, and glass transition temperature Tg of the resulting cellulose derivatives determined by the following methods are shown in Table 1.

(1) Molecular Weight and Molecular Weight Distribution

Mn, Mw, and MWD were determined by GPC. Specifically, GPC was carried out using a tetrahydrofuran solvent and polystyrene gels. The molecular weight of a sample was obtained using a molecular weight calibration curve previously prepared from a monodisperse polystyrene standard calibration curve. A GPC apparatus HLC-8220GPC from Tohso Corp. was used.

(2) Tg

Tg was determined using a differential scanning calorimeter DSC6200 from Seiko Instruments Inc. at a rate of temperature rise of 10° C./min. In Table 1, the minus sign indicates that thermal decomposition occurred before observation of glass transition, and the word "unclear" indicates that the sample did not show a clear peak in the DSC measurement while having a Tg as is seen from its melt moldability as demonstrated later.

TABLE 1

| | Compound | Mn | Mw | MWD | Tg |
|---|---|---|---|---|---|
| Example 1 | P-1 | 70000 | 298000 | 4.3 | unclear |
| Example 2 | P-2 | 72000 | 455000 | 6.3 | 80 |
| Example 3 | P-3 | 114000 | 442000 | 3.9 | 120 |
| Example 4 | P-4 | 100000 | 245000 | 2.5 | 150 |
| Example 5 | P-5 | 110000 | 330000 | 3.0 | 90 |
| Example 6 | P-6 | 78000 | 215000 | 2.8 | unclear |
| Example 7 | P-7 | 98000 | 310000 | 3.2 | 100 |
| Example 8 | P-8 | 102000 | 320000 | 3.1 | 106 |
| Example 9 | P-9 | 69000 | 298000 | 4.3 | 120 |
| Comp. Example 1 | H-1 | 70000 | 160000 | 2.3 | unclear |
| Comp. Example 2 | H-2 | 130000 | 416000 | 3.2 | — |
| Comp. Example 3 | H-3 | 128000 | 420000 | 3.3 | — |
| Comp. Example 4 | H-4 | 102000 | 316000 | 3.1 | 110 |
| Comp. Example 5 | H-5 | 87000 | 273000 | 3.1 | unclear |

Example 1

Making Molded Article from Cellulose Derivative (1) Preparation of Test Specimens Cellulose derivative P-1 was fed to an injection molding machine (semi-automatic injection machine from Imoto Machinery Co., Ltd.) and molded at a cylinder temperature of 250° C., a mold temperature of 30° C., and an injection pressure of 1.8 kgf/cm$^2$ to make multipurpose specimens measuring 4×10×80 mm (for impact test and thermal deformation test).

The cylinder temperature in polymer molding was decided so that the melt flow rate might range from 5 to 15 g/10 min. The mold temperature was 30° C.

(2) Film Formation

Cellulose derivative P-1 was melt molded into 100 μm thick film using Mini Test Press from Toyo Seiki Kogyo Co., Ltd. at a press temperature of 240° C.

Examples 2 to 9 and Comparative Examples 1 to 5

Test specimens were prepared in the same manner as in Example 1, except for using each of cellulose derivatives P-2 to P-9 and comparative cellulose derivatives H-1, H-2, H-3 (methyl cellulose having a degree of methyl substitution of 1.8, from Wako Pure Chemical), H-4 (ethyl cellulose having a degree of ethyl substitution of 2.4, from Sigma-Aldrich), and H-5. The molding conditions are shown in Table 2.

(1) Measurement of Physical Properties of Specimen

The Charpy impact strength of each test specimen was measured using a Charpy impact tester from Toyo Seiki Co., Ltd. in accordance with the following method. The results obtained are shown in Table 2.

Charpy Impact Strength:

ISO 179 was followed. A V-notch having a included angle of 45°±0.5° and a base radius of 0.25±0.05 mm was made in the specimen. The notched specimen was conditioned at 30°±2° C. and 50%±5% RH for at least 48 hours. Edgewise impact strength was measured using the Charpy impact tester.

(2) Measurement of Physical Properties of Film

The resulting film was evaluated for elongation at break in accordance with the method of JIS K7127. The results obtained are shown in Table 2.

the art that various changes and modifications can be made therein without departing from the spirit and scope of the invention.

This application is based on Japanese Patent Application filed on Sep. 30, 2008 (Application No. 2008-255042), the entire disclose of which is hereby incorporated by reference.

The invention claimed is:

1. A cellulose derivative comprising:
   (a) a hydrocarbon group; and
   (b) an aliphatic oxycarbonyl group, wherein the number of carbon atoms in the aliphatic group is 6 to 10.

2. The cellulose derivative as claimed in claim 1, wherein the number of carbon atoms in the hydrocarbon group is 1 to 9.

TABLE 2

| | Compound | $DS_A$ | $DS_B$ | $DS_C$ | $DS_D$ | Cylinder Temp. (° C.) | Mold Temp. (° C.) | Charpy Impact Strength (kJ/m$^2$) | Elongation at Break (%) |
|---|---|---|---|---|---|---|---|---|---|
| Example 1 | P-1 | 0.5 | 1.8 | 0.7 | 0 | 250 | 30 | 11 | 25 |
| Example 2 | P-2 | 0.4 | 1.8 | 0.8 | 0 | 230 | 30 | 13 | 65 |
| Example 3 | P-3 | 0.4 | 1.8 | 0.8 | 0 | 220 | 30 | 15 | 74 |
| Example 4 | P-4 | 0.3 | 2.1 | 0.6 | 0 | 220 | 30 | 17 | 72 |
| Example 5 | P-5 | 0.3 | 1.8 | 0.9 | 0 | 210 | 30 | 17 | 81 |
| Example 6 | P-6 | 0.5 | 2.1 | 0.4 | 0 | 230 | 30 | 10 | 20 |
| Example 7 | P-7 | 0.2 | 2.4 | 0.4 | 0 | 200 | 30 | 13 | 29 |
| Example 8 | P-8 | 0.2 | 2.4 | 0.4 | 0 | 190 | 30 | 14 | 31 |
| Example 9 | P-9 | 0.0 | 1.8 | 1.2 | 0 | 210 | 30 | 13 | 21 |
| Compara. Example 1 | H-1 | 0.4 | 0 | 2.6 | 0 | 250 | 30 | — | — |
| Compara. Example 2 | H-2 | 0.9 | 2.1 | 0 | 0 | | | non-thermoplastic | |
| Compara. Example 3 | H-3 | 1.2 | 1.8 | 0 | 0 | | | non-thermoplastic | |
| Compara. Example 4 | H-4 | 0.6 | 2.4 | 0 | 0 | 220 | 30 | 0.8 | 3 |
| Compara. Example 5 | H-5 | 0.3 | 0 | 0.5 | 2.2 | | | non-thermoplastic | |

$DS_A$: degree of hydrogen substitution;
$DS_B$: degree of ether substitution;
$DS_C$: degree of carbonate substitution;
$DS_D$: degree of ester substitution As is apparently seen from the results in Table 2, methyl cellulose (Comparative Examples 2 and 3) and ethyl carbonate acetyl cellulose (Comparative Example 5) have no thermoplasticity whereas introduction of a carbonate structure imparts thermoplasticity and moldability and provides high impact resistance in Examples 1 to 9. Introduction of a carbonate structure to ethyl cellulose having thermoplasticity brings about great improvement particularly on impact resistance. In the case of using cellulose ethyl carbonate (Comparative Example 1), the test specimens and the film were too brittle to be evaluated for mechanical characteristics. These results prove that all the molded articles obtained from the cellulose derivatives of the invention exhibit high impact resistance and flexibility. That is, the cellulose derivatives of the invention bring the unexpected effects: achievement of thermoplasticity and excellent impact resistance and breaking elongation.

INDUSTRIAL APPLICABILITY

The molded article obtained from the cellulose derivative or cellulose resin composition of the invention has good properties such as impact resistance and heat resistance and is suited for use as constituent parts of automobiles, home appliances, and electrical or electronic equipment, machine parts, and architectural materials for houses and buildings. Derived from plants, the cellulose derivative of the invention is able to substitute for conventional petroleum-derived resins as a material contributory to the prevention of global warming.

While the invention has been described with reference to its specific embodiments, it will be apparent to those skilled in 3. The cellulose derivative as claimed in claim 1, wherein the hydrocarbon group (a) is a methyl group or an ethyl group.

4. The cellulose derivative as claimed in claim 1, wherein the hydrocarbon group (a) is a methyl group.

5. A process for preparing the cellulose derivative as claimed in claim 1, comprising a step of allowing a cellulose ether to react with a chloroformic acid ester in the presence of a base.

6. The cellulose derivative as claimed in claim 1, wherein the number of carbon atoms in the aliphatic group is 7 to 9.

7. The cellulose derivative as claimed in claim 1, wherein:
   the degree of hydrogen substitution ($DS_A$), defined as the number of unsubstituted hydroxyl groups at the 2-, 3-, and 6-positions per β-glucose unit of the cellulose derivative, is 0.2 to 1.2;
   the degree of hydrocarbon substitution ($DS_B$), defined as the number of hydroxyl groups at the 2-, 3-, and 6-positions substituted with a hydrocarbon group per β-glucose unit of the cellulose derivative, is 1.5 to 2.5; and
   the degree of aliphatic oxycarbonyl substitution ($DS_C$), defined as the number of hydroxyl groups at the 2-, 3-, and 6-positions substituted with an aliphatic oxycarbonyl group per β-glucose unit of the cellulose derivative, is 0.3 to 1.5.

8. The cellulose derivative as claimed in claim 1, wherein the aliphatic oxycarbonyl group is selected from the group consisting of hexyl oxycarbonyl, octyl oxycarbonyl, and 2-ethylhexyl oxycarbonyl.

* * * * *

UNITED STATES PATENT AND TRADEMARK OFFICE
CERTIFICATE OF CORRECTION

PATENT NO.         : 8,598,336 B2                                                         Page 1 of 1
APPLICATION NO. : 13/121858
DATED              : December 3, 2013
INVENTOR(S)        : Nozoe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 28 days.

Signed and Sealed this
Twenty-second Day of September, 2015

Michelle K. Lee
*Director of the United States Patent and Trademark Office*